United States Patent
Hwang et al.

(10) Patent No.: US 10,743,192 B2
(45) Date of Patent: Aug. 11, 2020

(54) COMMUNICATION SERVICE PROVIDING METHOD USING MOBILE CELL

(71) Applicant: LG ELECTRONICS INC., Seoul (KR)

(72) Inventors: Daesung Hwang, Seoul (KR); Seungmin Lee, Seoul (KR); Hanjun Park, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 15/777,871

(22) PCT Filed: Nov. 24, 2016

(86) PCT No.: PCT/KR2016/013638
§ 371 (c)(1),
(2) Date: May 21, 2018

(87) PCT Pub. No.: WO2017/091011
PCT Pub. Date: Jun. 1, 2017

(65) Prior Publication Data
US 2018/0352443 A1    Dec. 6, 2018

Related U.S. Application Data

(60) Provisional application No. 62/259,595, filed on Nov. 24, 2015.

(51) Int. Cl.
*H04B 7/14* (2006.01)
*H04W 16/26* (2009.01)
(Continued)

(52) U.S. Cl.
CPC ............ *H04W 16/26* (2013.01); *H04W 16/18* (2013.01); *H04W 24/08* (2013.01); *H04W 40/20* (2013.01);
(Continued)

(58) Field of Classification Search
CPC ............................ H04W 84/005; H04W 64/00
See application file for complete search history.

(56) References Cited

U.S. PATENT DOCUMENTS 5,636,245 A * 6/1997 Ernst ................ G08G 1/096716
375/259
2009/0180448 A1 * 7/2009 Kobayashi ............ H04W 40/08
370/338
(Continued)

FOREIGN PATENT DOCUMENTS

EP           2938117 A1 * 10/2015 ............ H04W 16/18
KR    10-2009-0002363 A      1/2009
(Continued)

OTHER PUBLICATIONS

Seung-Yeop Chae et al., "Mobile Personal Cell for Next-Generation Mobile Communication System", The Journal of the Korean Institute of Communications Sciences, vol. 32, No. 4, pp. 64-71, Mar. 2015, see section II.
(Continued)

*Primary Examiner* — Abdelillah Elmejjarmi
(74) *Attorney, Agent, or Firm* — Dentons US LLP

(57) ABSTRACT

To achieve the above described objective, a disclosure of the present specification provides a method in which a cell having mobility provides a communication service. The method may comprise the steps of: obtaining, by the cell having mobility, first channel state information associated with a departure point node that is to transmit data; obtaining, by the cell having mobility, second channel state information associated with a destination node that is to receive data; and determining, by the cell having mobility, a location where the cell is to be located at a time point for data communication relay between the departure point node and the destination node on the basis of the first channel state information and the second channel state information. In this
(Continued)

instance, the cell having mobility can move in the horizontal direction and the vertical direction from the surface of the earth.

13 Claims, 16 Drawing Sheets

(51) Int. Cl.
    *H04W 24/08*     (2009.01)
    *H04W 16/18*     (2009.01)
    *H04W 88/04*     (2009.01)
    *H04W 40/20*     (2009.01)
    *H04W 64/00*     (2009.01)
    *H04W 84/00*     (2009.01)
    *H04W 84/04*     (2009.01)
(52) U.S. Cl.
    CPC ......... *H04W 64/003* (2013.01); *H04W 88/04* (2013.01); *H04W 84/005* (2013.01); *H04W 84/045* (2013.01)

(56) References Cited

U.S. PATENT DOCUMENTS

2014/0154970 A1*   6/2014   Long ........................ H04B 7/15
                                                                 455/7
2016/0255668 A1*   9/2016   Wei ........................ H04W 8/005
                                                                 455/434

FOREIGN PATENT DOCUMENTS

KR     10-2011-0068933 A     6/2011
WO         2015/026111 A1     2/2015

OTHER PUBLICATIONS

Kyung-Nam Park et al., "Optimal WLAN AP Location Decision for Handover in 3-dimensional Space", Proceedings of Symposium of the Korean Institute of Communications and Information Sciences 2015 Summer Conference, pp. 1296-1297, Jun. 2015, See section II.

* cited by examiner

COMMUNICATION SERVICE PROVIDING METHOD USING MOBILE CELL

CROSS-REFERENCE TO RELATED APPLICATIONS

This application is the National Stage filing under 35 U.S.C. 371 of International Application No. PCT/KR2016/013638, filed on Nov. 24, 2016, which claims the benefit of U.S. Provisional Application No. 62/259,595 filed on Nov. 24, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink and uses single carrier-frequency division multiple access (SC-FDMA) in an uplink. The 3GPP LTE employs multiple input multiple output (MIMO) having up to four antennas.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a Physical Downlink Shared Channel (PDSCH) and a Physical Downlink Control Channel (PDCCH), and an uplink channel, i.e., a Physical Uplink Shared Channel (PUSCH) and a Physical Uplink Control Channel (PUCCH).

Meanwhile, research has expanded from the concept of cells fixed to a particular location to cells having mobility. Most particularly, options of using unmanned air vehicles as the next generation mobile cells are also being considered. Accordingly, such cells having mobility may be advantageous for supporting communication services in regions where communications infrastructure is difficult to establish or where the existing communications infrastructure has been destroyed or severely damaged due to catastrophic or disastrous situations. Therefore, discussion need to be carried out on the adequate positioning, initial configuration, and so on, of cells having mobility.

SUMMARY OF THE INVENTION

Technical Objects

An object of this specification is to provide a communication method using cells having mobility.

Technical Solutions

In order to achieve the above-described technical object, a disclosure of this specification provides a method for providing communication services by a cell having mobility. The method may include the steps of acquiring, by the cell having mobility, first channel status information between a source node to which data is to be transmitted and the cell having mobility, acquiring, by the cell having mobility, second channel status information between the cell having mobility and a destination node from which data is to be received, and determining, by the cell having mobility, a location where the cell having mobility is to be positioned at a data communication relay point between the source node and the destination node based on the first channel status information and the second channel status information. In this case, the cell having mobility may be capable of moving along a horizontal direction and a perpendicular direction to an earth's surface.

In this case, in the step of determining a location, a point where a cost function being calculated based on the first channel status information and the second channel status information may be determined as the location where the cell having mobility is to be positioned at the data communication relay point. Conversely, in the step of determining a location, by using a pathloss model being established based on the first channel status information and the second channel status information, a point where a sum of a pathloss of a link between the source node and the cell having mobility and a pathloss of a link between the cell having mobility and the destination node is a minimum value may be determined as the location where the cell having mobility is to be positioned at the data communication relay point.

Additionally, the step of determining a location may include, in case a plurality of source nodes exist, configuring one or more areas where the cell having mobility is capable of collecting data from each source node, in case a plurality of destination nodes exist, configuring one or more areas where the cell having mobility is capable of transmitting data to each destination node, and configuring a travel path for transmitting data from the source node to the destination node, based on the one or more areas where the cell having mobility is capable of collecting data from each source node and the one or more areas where the cell having mobility is capable of transmitting data to each destination node. Furthermore, in the step of determining a location, in case a fixed base station providing communication services exists at a location where the cell having mobility is to be positioned at the determined relay point, communication services may be provided to the destination node by using antenna ports equipped in the cell having mobility and antenna ports equipped in the fixed base station simultaneously.

The method may further include the steps of receiving, by the cell having mobility, information on the assigned geographical region, and identifying, by the cell having mobility, any one of the source node and the destination node within the assigned geographical region. In this case, the step of identifying any one of the source node and the destination node may include the steps of broadcasting a discovery signal corresponding to the assigned geographical region, receiving a response signal corresponding to the discovery signal from any one of the source node and the destination node, and identifying any one of the source node and the destination node based on the received response signal.

In order to achieve the above-described technical object, a disclosure of this specification provides a cell having mobility and providing communication services. The cell may include a radio frequency (RF) unit receiving first channel status information between a source node to which data is to be transmitted and the cell having mobility and receiving second channel status information between the cell having mobility and a destination node from which data is to be received, and a processor determining a location where the cell having mobility is to be positioned at a data communication relay point between the source node and the destination node based on the first channel status information and the second channel status information.

Effects of the Invention

According to a disclosure of this specification, in case a communications infrastructure for a particular (or specific) region of interest is required to be established, communication services may be effectively provided to user equipments (UEs) within the particular region of interest by using cells having mobility.

DESCRIPTION OF EXEMPLARY EMBODIMENTS

Figure 1:
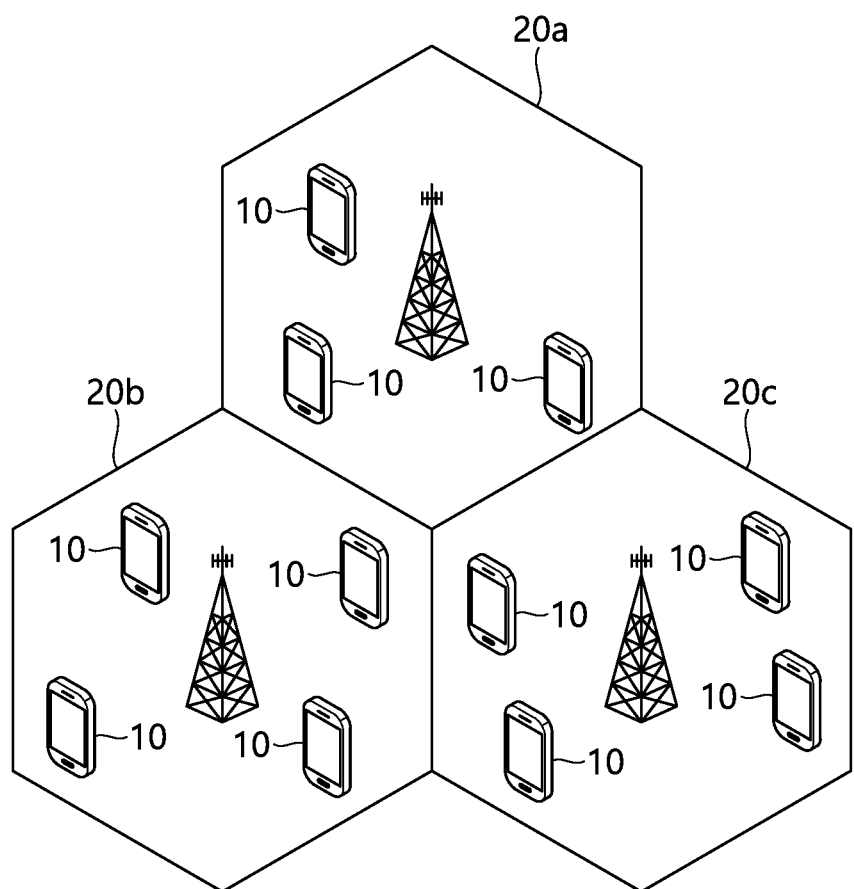
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, mobile terminal (MT), user equipment (UE), mobile equipment (ME), mobile station (MS), user terminal (UT), subscriber station (SS), handheld device, or access terminal (AT).

As used herein, 'base station' generally refers to a fixed station that communicates with a wireless device and may be denoted by other terms such as evolved-NodeB (eNB), base transceiver system (BTS), or access point.

Hereinafter, applications of the present invention based on the 3rd generation partnership project (3GPP) long term evolution (LTE) or 3GPP LTE-advanced (LTE-A) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 10. Each base station 10 provides a communication service to specific geographical areas (generally, referred to as cells) 10a, 10b, and 10c.

The user equipment 20 generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 10 to the UE 20 and an uplink means communication from the UE 20 to the base station 10. In the downlink, a transmitter may be a part of the base station 10 and a receiver may be a part of the UE 20. In the uplink, the transmitter may be a part of the UE 20 and the receiver may be a part of the base station 10.

Hereinafter, the LTE system will be described in detail.

Figure 2:
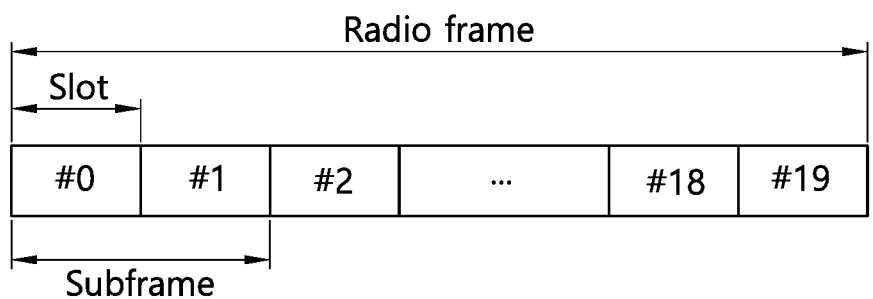
FIG. 2 illustrates the structure of a radio frame according to frequency division duplex (FDD) in 3GPP LTE.

FIG. 2 illustrates the structure of a radio frame according to frequency division duplex (FDD) in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a transmission time interval (TTI). The TTI may be the unit of scheduling for data transmission. For example, the length of one radio frame may be 10 ms, the length of one sub-frame may be 1 ms, and the length of one slot may be 0.5 ms.

The structure of a radio frame is merely an example, and the number of sub-frames included in the radio frame or the number of slots included in a sub-frame may vary differently.

Meanwhile, one slot may include a plurality of OFDM symbols. How many OFDM symbols are included in one slot may vary depending on cyclic prefix (CP).

Figure 3:
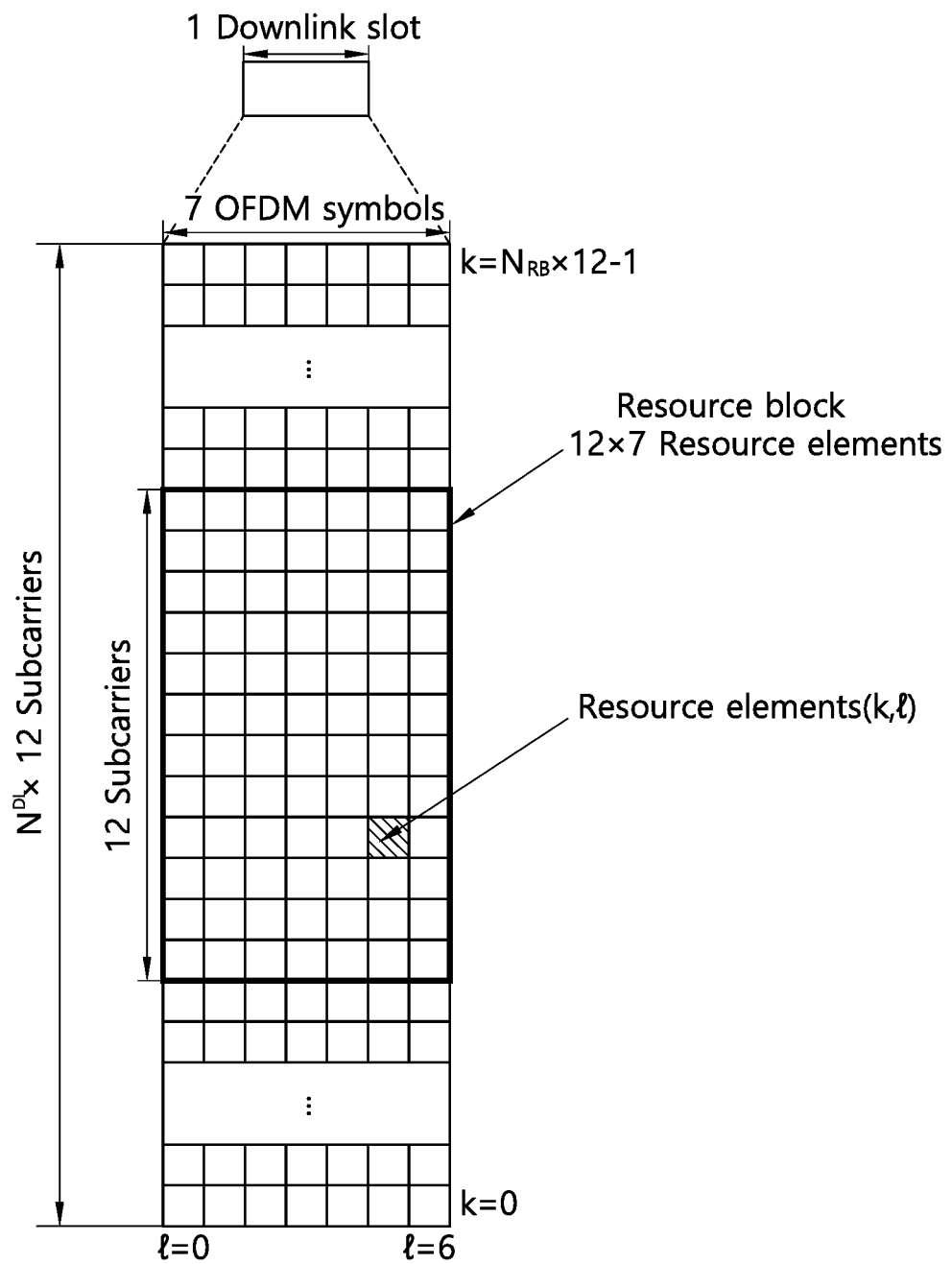
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of orthogonal frequency division multiplexing (OFDM) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
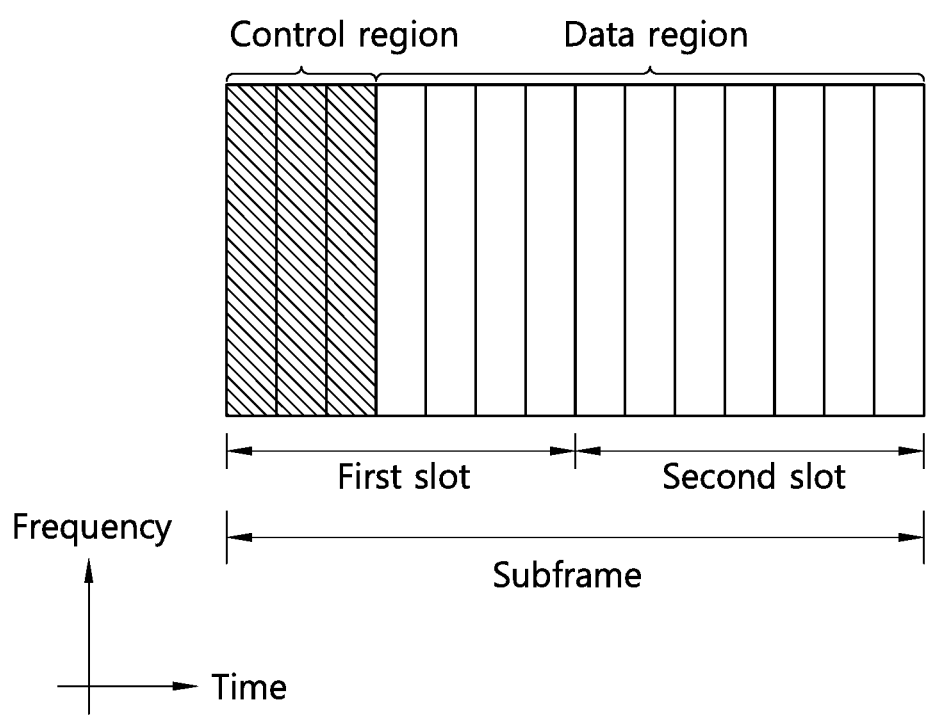
FIG. 4 illustrates the architecture of a downlink sub-frame in 3GPP LTE.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted as transmission time interval (TTI). For example, the length of one sub-frame may be 1 ms, and the length of one slot may be 0.5 ms.

One slot may include a plurality of orthogonal frequency division multiplexing (OFDM) symbols in the time domain. OFDM symbol is merely to represent one symbol period in the time domain since 3GPP LTE adopts an orthogonal frequency division multiple access (OFDMA) for downlink (DL), and the multiple access scheme or name is not limited thereto. For example, the OFDM symbol may be referred to as a single carrier-frequency division multiple access (SC-FDMA) symbol or symbol period.

Figure 5:
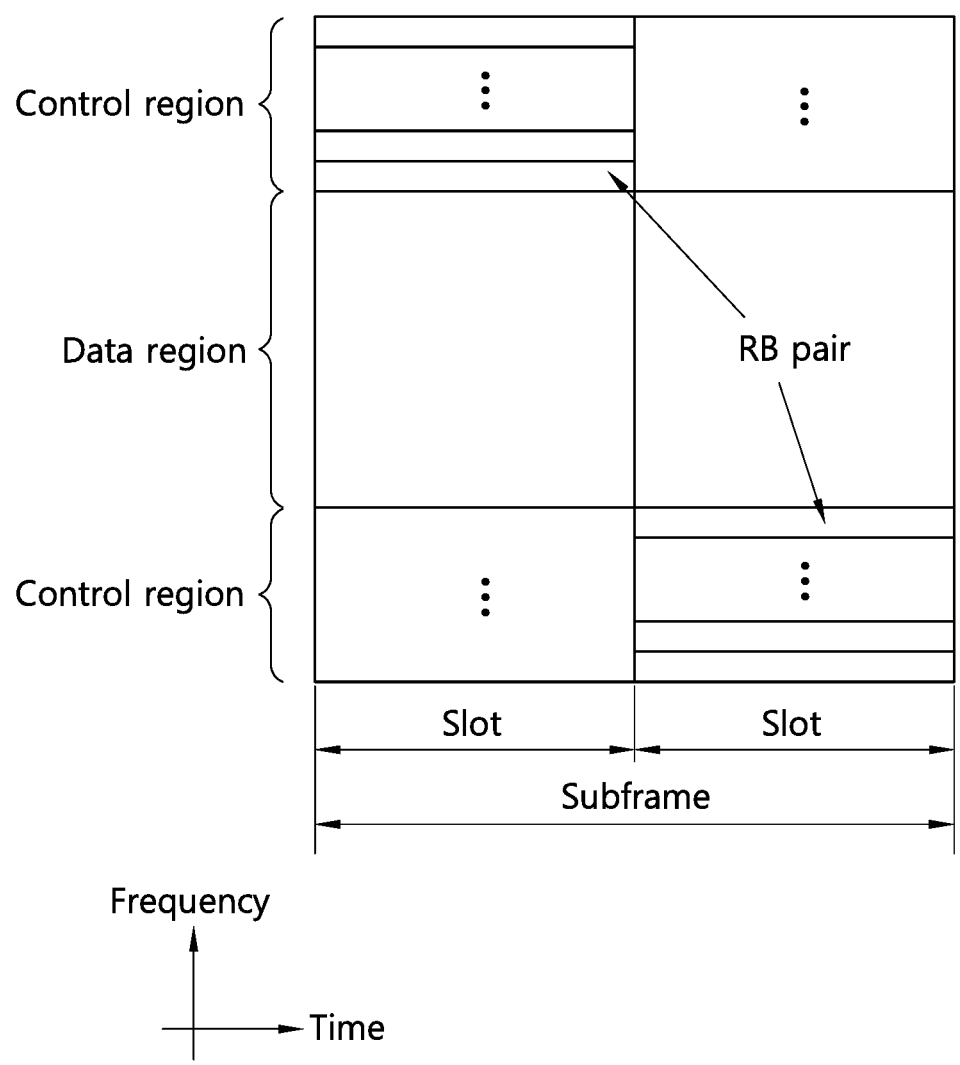
FIG. 5 illustrates the architecture of an uplink sub-frame in 3GPP LTE.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The downlink (DL) sub-frame is split into a control region and a data region in the time domain. The control region includes up to first three OFDM symbols in the first slot of the sub-frame. However, the number of OFDM symbols included in the control region may be changed. A physical downlink control channel (PDCCH) and other control channels are assigned to the control region, and a PDSCH is assigned to the data region.

As set forth in 3GPP TS 36.211 V10.4.0, the physical channels in 3GPP LTE may be classified into data channels, such as a physical downlink shared channel (PDSCH) and a physical uplink shared channel (PUSCH), and control channels, such as a physical downlink control channel (PDCCH), a physical control format indicator channel (PCFICH), a physical hybrid-ARQ indicator channel (PHICH), and a physical uplink control channel (PUCCH).

The PCFICH transmitted in the first OFDM symbol of the sub-frame carries a control format indicator (CIF) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries a positive-acknowledgement (ACK)/negative-acknowledgement (NACK) signal for a UL hybrid automatic repeat request (HARQ). The ACK/NACK signal for uplink (UL) data on the PUSCH transmitted by the wireless device is sent on the PHICH.

The physical broadcast channel (PBCH) is transmitted in the first four OFDM symbols in the second slot of the first sub-frame of the radio frame. The PBCH carries system information necessary for the wireless device to communicate with the base station, and the system information transmitted through the PBCH is denoted as master information block (MIB). In comparison, system information transmitted on the PDSCH indicated by the PDCCH is denoted as system information block (SIB).

The PDCCH may carry activation of voice over internet protocol (VoIP) and a set of transmission power control commands for individual UEs in some UE group, resource allocation of an upper layer control message such as a random access response transmitted on the PDSCH, system information on DL-SCH, paging information on PCH, resource allocation information of uplink shared channel (UL-SCH), and resource allocation and transmission format of downlink-shared channel (DL-SCH). A plurality of PDCCHs may be sent in the control region, and the terminal may monitor the plurality of PDCCHs. The PDCCH is transmitted on one control channel element (CCE) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as downlink (DL) grant), resource allocation of PUSCH (this is also referred to as uplink (UL) grant), a set of transmission power control commands for individual UEs in some UE group, and/or activation of Voice over Internet Protocol (VoIP).

The base station determines a PDCCH format according to the DCI to be sent to the terminal and adds a cyclic redundancy check (CRC) to control information. The CRC is masked with a unique identifier (radio network temporary identifier (RNTI)) depending on the owner or purpose of the PDCCH. In case the PDCCH is for a specific terminal, the terminal's unique identifier, such as cell-RNTI (C-RNTI), may be masked to the CRC. Or, if the PDCCH is for a paging message, a paging indicator, for example, paging-RNTI (P-RNTI) may be masked to the CRC. If the PDCCH is for a system information block (SIB), a system information identifier, system information-RNTI (SI-RNTI), may be masked to the CRC. In order to indicate a random access response that is a response to the terminal's transmission of a random access preamble, an random access-RNTI (RA-RNTI) may be masked to the CRC.

In 3GPP LTE, blind decoding is used for detecting a PDCCH. The blind decoding is a scheme of identifying whether a PDCCH is its own control channel by demasking a desired identifier to the cyclic redundancy check (CRC) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as radio network temporary identifier (RNTI)) to the CRC depending on the owner or purpose of the PDCCH.

According to 3GPP TS 36.211 V10.4.0, the uplink channels include a PUSCH, a PUCCH, a Sounding Reference Signal (SRS), and a physical random access channel (PRACH).

FIG. 5 illustrates the architecture of an uplink sub-frame in 3GPP LTE.

Referring to FIG. 5, the uplink sub-frame may be separated into a control region and a data region in the frequency domain. The control region is assigned a physical uplink control channel (PUCCH) for transmission of uplink control information. The data region is assigned a physical uplink shared channel (PUSCH) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes a hybrid automatic repeat request (HARQ), an acknowledgement (ACK)/non-acknowledgement (NACK), a channel quality indicator (CQI) indicating a downlink channel state, and a scheduling request (SR) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a precoding matrix indicator (PMI), an HARQ, and a rank indicator (RI). Or, the uplink data may consist only of control information.

Hereinafter, an SC-FDMA transmission scheme is now described.

Long-Term Evolution (LTE) adopts, for uplink, Single-Carrier (SC) FDMA that is similar to Orthogonal Frequency Division Multiplexing (OFDM).

SC-FDMA may also be referred to as DFT-spread OFDM (DFT-s OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using Fast Fourier Transform (FFT) and Inverse-FFT (IFFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in Peak to Average Power Ratio (PAPR). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, LTE-Advanced employs a clustered DFT-s-OFDM scheme that allows non-contiguous resource allocation The clustered DFT-s-OFDM transmission scheme is a variation to the existing SC-FDMA transmission scheme and divides the data symbols that were subjected to a precoder into a plurality of sub-blocks and performs mapping with the sub-blocks separated from each other in the frequency domain.

Hereinafter, the LTE-A system will be described in more detail.

Some major features of the clustered DFT-s-OFDM scheme include enabling frequency-selective resource allocation so that the scheme may flexibly deal with a frequency selective fading environment.

In this case, the clustered DFT-s-OFDM scheme, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

<Carrier Aggregation>

A carrier aggregation system is now described.

Figure 6:
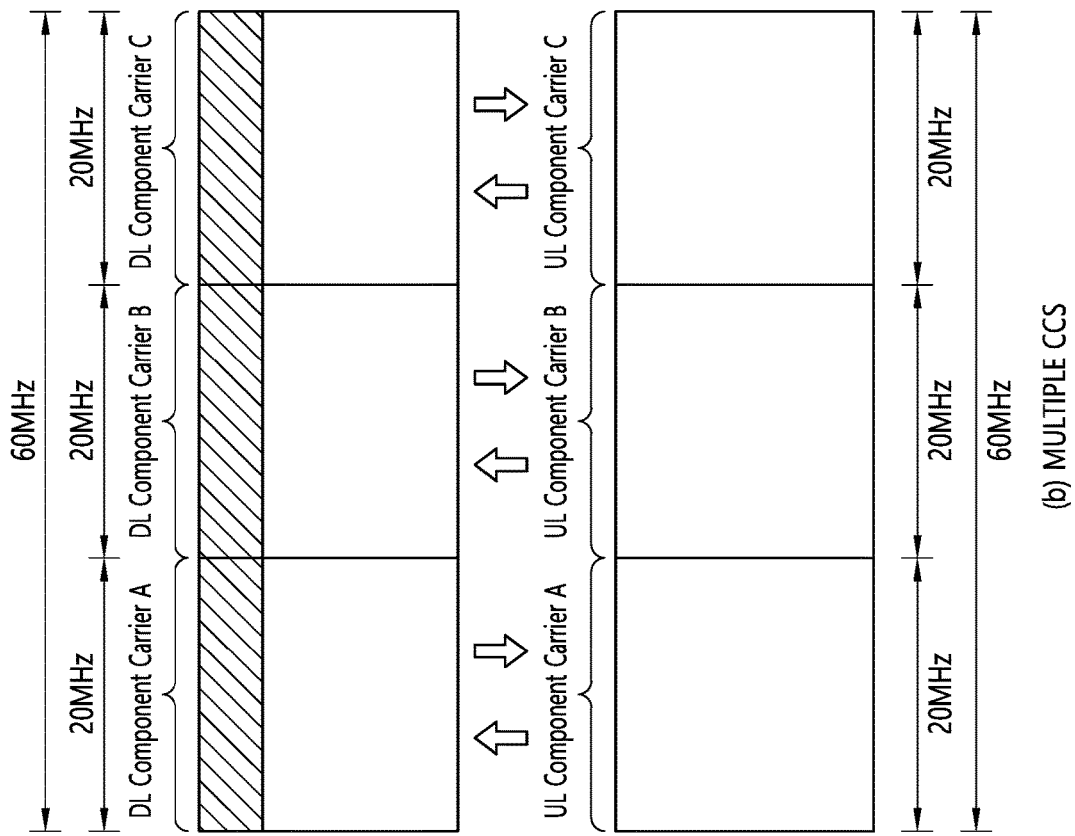
FIG. 6 illustrates an example of comparison between a single carrier system and a carrier aggregation system.
Figure 6:
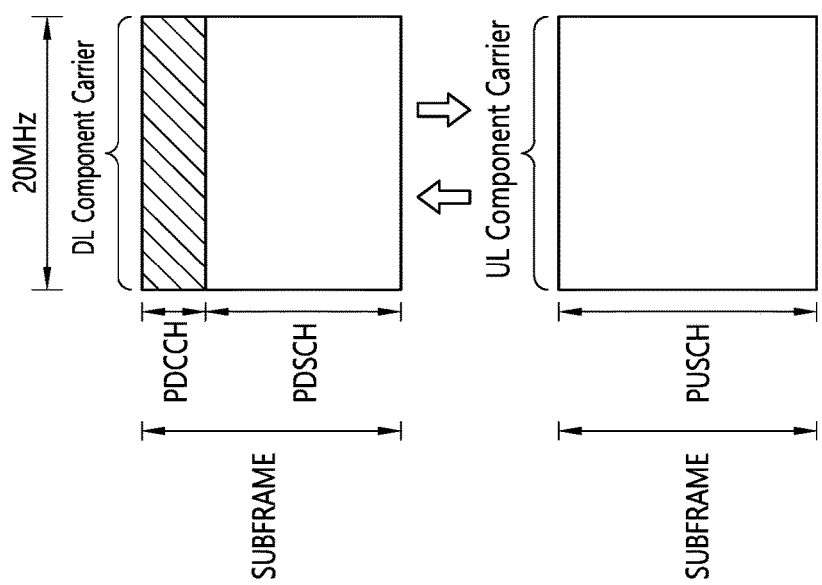

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or media access control (MAC) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The primary component carrier (PCC) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The secondary component carrier (SCC) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

Disclosure of the Specification

In the next generation communication system or next generation communications infrastructure, research has expanded from the concept of cells fixed to a particular location to cells having mobility. Most particularly, options of using unmanned air vehicles as the next generation mobile cells are also being considered. Accordingly, such cells having mobility may be advantageous for supporting communication services in regions where communications infrastructure is difficult to establish or where the existing communications infrastructure has been destroyed or severely damaged due to catastrophic or disastrous situations. Therefore, discussion need to be carried out on the adequate positioning, initial configuration, and so on, of cells having mobility.

Therefore, this specification proposes a solution for performing positioning and initial configuration, and so on, of a cell for providing communication services to user equipments (UEs) within a particular region of interest by using cells having mobility.

Hereinafter, for simplicity in the description of this specification, a cell having mobility and being capable of providing communication services to UEs existing in a particular region of interest will be referred to as a drone cell. Such drone cells are capable of moving along a horizontal direction from the earth's surface as well as a vertical direction from the earth's surface. More specifically, a drone cell is capable of performing three-dimensional movements (or travelling). Moreover, drone cells will not be limited only to unmanned air vehicles. And, therefore, any device capable of performing land, on-the-water, or underwater travelling and providing communication services may correspond to a drone cell. Additionally, a drone cell may provide a positioning (or position tracking) function. For example, although a drone cell may be configured to include a Global Positioning System (GPS) circuit for position tracking, this specification will not be limited only to this, and, therefore, this specification may include a third position tracking configuration element in order to perform position tracking.

The solution for performing positioning and initial configuration of a drone cell, which is proposed in this specification, may be divided into 5 different procedures. However, it will be apparent that, according to the purpose (or object) or environment, and so on, of wireless communication, part of the procedure for performing the positioning and initial configuration of drone cells may be added, varied or omitted.

1. Initial Positioning of a Drone Cell

Firstly, one or more drone cells are assigned with a specific geographical region to which communication services are to be provided. A drone cell may be assigned, in advance, with a geographical region to which communication services are to be provided through a higher layer signal. However, this specification will not be limited only to this. A drone cell being assigned with the geographical region to which communication services are to be provided may move (or relocate) to a specified initial location within the corresponding geographical region. Additionally, the drone cell that has arrived at the initial location may be on stand-by while floating in the air so that it does not deviate from the assigned geographical region.

One or more drone cells may receive control information or service information from a master base station. At this point, the master base station may correspond to a base station that is located on land. However, this specification will not be limited only to this, and, therefore, the master base station may also correspond to another type of unmanned vehicle other than a drone cell or a satellite. In this case, a hierarchical structure may exist between a drone cell and the master base station.

Most particularly, a drone cell may receive a reference signal from the master base station and may estimate a channel status by using the received reference signal. Also, the drone cell may report the channel status estimation results to the master base station. In this case, the drone cell may report the channel status estimation result to the master base station by triggering a specific time point or a specific location.

2. Node Identification of a Drone Cell

Figure 7:
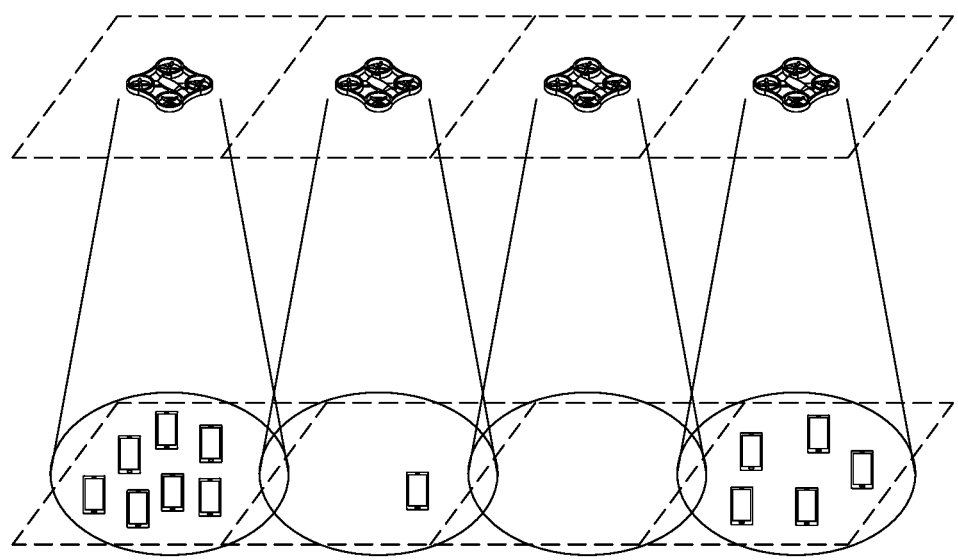
FIG. 7 is a schematic diagram of a method for identifying a mode of a drone cell according to this specification.

FIG. 7 is a schematic diagram of a method for identifying a mode of a drone cell according to this specification.

Referring to FIG. 7, one or more drone cells that are positioned at an initial location within the assigned geographical region detect a node existing within the respectively assigned geographical regions. Herein, the node may include a user device, a sensor, and so on. Additionally, the one or more drone cells measure the characteristics of the detected node. Herein, the characteristics of the node may include a method for performing data transmission and/or reception between a node and a drone cell, a channel status between a node and a drone cell, and so on.

According to one of the examples for detecting a node by a drone cell, each drone cell being positioned at its initial location transmits a signal for discovering (or searching) a node. For example, as a discovery signal, the signal for discovering a node may be broadcasted by the drone cell. In this case, the discovery signal may include information that may be used by the node for transmitting a response signal. For example, a discovery signal may include information on a transmission time point of a response signal, a transmission sequence of a response signal, and so on. Additionally, the discovery signal may also include information on the location of a drone cell.

One or more nodes transmit a response signal corresponding to the signal for discovering the node, which is received from the drone cell. In this case, the node may generate and transmit the response signal based on the information included in the signal for discovering the node, which is received from the drone cell. Additionally, when one node receives a plurality of signals for discovering a node from a plurality of drone cell, the corresponding node may compare the channel status of the plurality of drone cells or the loads of the drone cell and may, then, select one drone cell. Then, the node may transmit a response signal corresponding to the selected drone cell.

Thereafter, based on the response signal that is received from the one or more nodes, the drone cell may detect a node existing within its assigned geographical region.

According to another example for detecting a node by a drone cell, one or more nodes transmit a signal for discovering a drone cell regardless of the initial positioning of the drone cell. For example, the signal for discovering the drone cell may correspond to a discovery signal. Additionally, the node may transmit a discovery signal according to a predetermine cycle period. However, this specification will not be limited only to this. And, therefore, the node may transmit a discovery signal in accordance with a cycle period that is calculated based on a node identifier or in accordance with a random cycle period. Thereafter, the drone cell may detect a node existing within its assigned geographical region based on the signal for discovering the drone cell, which is received from the one or more nodes.

According to one of the example for measuring the characteristics of a node by the drone cell, a channel status between the corresponding drone cell and the node may be estimated. Thereafter, the node may report the estimated channel status to the drone cell. Herein, in order to estimate the channel status, the node may use a reference signal of the discovery signal, which is transmitted by the drone cell, a reference signal of the response signal, or a third reference signal. Furthermore, in order to report the estimated channel status, the node may use a response signal corresponding to the discovery signal or a third transmission channel.

3. Information Sharing of a Drone Cell

Figure 8:
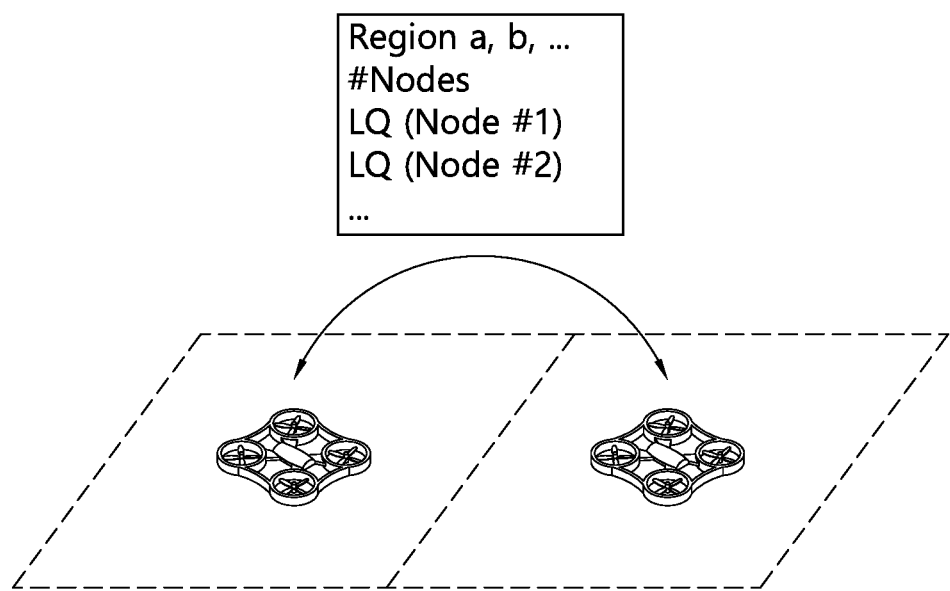
FIG. 8 is a schematic diagram of a method for sharing information of a drone cell according to this specification.

FIG. 8 is a schematic diagram of a method for sharing information of a drone cell according to this specification.

Referring to FIG. 8, a drone cell that has discovered (or detected) a node existing within its assigned geographical region may share information on the detected node, and so on, with another drone cell. In this case, the drone cell may share its information with another drone cell by using a Radio Access Technology (RAT) that is used for the communication between the corresponding drone cell and the node, or by using a third RAT. In case the drone cell shares its information with another drone cell by using the RAT that is used for the communication between the corresponding drone cell and the node, the corresponding drone cell may perform communication with another cell by using a radio resource that is independent from the radio resource, which is used for the communication between the corresponding drone cell and the node.

Part or all of the following information may be included in the information that is shared between two or more drone cells.

Information on the geographical region being assigned to the drone cell

A number of nodes existing in the assigned geographical region

In this case, among the nodes existing in the assigned geographical region, the number of nodes may be limited to the nodes that have transmitted a response signal for the drone cells.

Channel status information between a drone cell and a node

In this case, the channel status information may include both a channel from the drone cell to the node and a channel from the node to the drone cell. Additionally, the channel status information may include a Reference Signal Received Power (RSRP) and/or a Reference Signal Received Quality (RSRQ).

Information on the drone cell

In this case, the information on the drone cell may include remaining battery life, estimated time remaining in the air, channel status information between the master base station and the drone cell, and so on. Additionally, the information on the drone cell may also include operation information, such as travelling direction (or moving direction), travel speed, point a departure, a waypoint, or point of destination, and so on, of the drone cell.

Additionally, all or part of the information that may be shared among the drone cells, as described above, may be reported to the master base station by the drone cell. The master base station may transmit additional indication or required information for some or all of the drone cells, based on the information collected (or gathered) from the drone cell. For example, the master base station may transmit an indication for changing the geographical region that is assigned to a specific drone cell based on the information received from the drone cell.

Furthermore, by using the above-described method for sharing information among drone cell, a first drone cell or the master base station may transmit the information to a third drone cell after stopping at the second drone cell (i.e., after using the second drone cell as a waypoint). For example, in case the distance between the master base station and the third drone cell is far, the master base station transmits the information it intends to transmit to the second drone cell, and, then, the second drone cell may forward the information received from the master base station to the third drone cell. In this case, the second drone cell may be configured of a single (single-hop) drone cell or multiple (multi-hop) drone cell. Herein, the multiple drone cells may relay information between the master base station and the third drone cell.

4. Reassignment of the Geographical Region of the Drone Cell

The number of nodes existing in the initially assigned geographical regions to each drone cell may not be consistent (or equal). For example, a plurality of nodes may exist in the geographical region assigned to a first drone cell, and only a minimum number of nodes or none may exist in the geographical region assigned to a second drone cell. As described above, in case the distribution of the nodes is not consistent (or equal), in the aspect of managing the nodes or providing services, it may be inefficient to simply assign drone cells in accordance with the size of the geographical region. Accordingly, additional operation processes are required to be carried out in order to standardize the number of nodes existing in the geographical regions assigned to the drone cells.

The master base station or a drone cell may reassign or change the geographical region assigned to a drone cell based on the information shared by another drone cell. Additionally, the master base station or a drone cell may reassign or change a service supported region based on the information shared by another drone cell.

Figure 9:
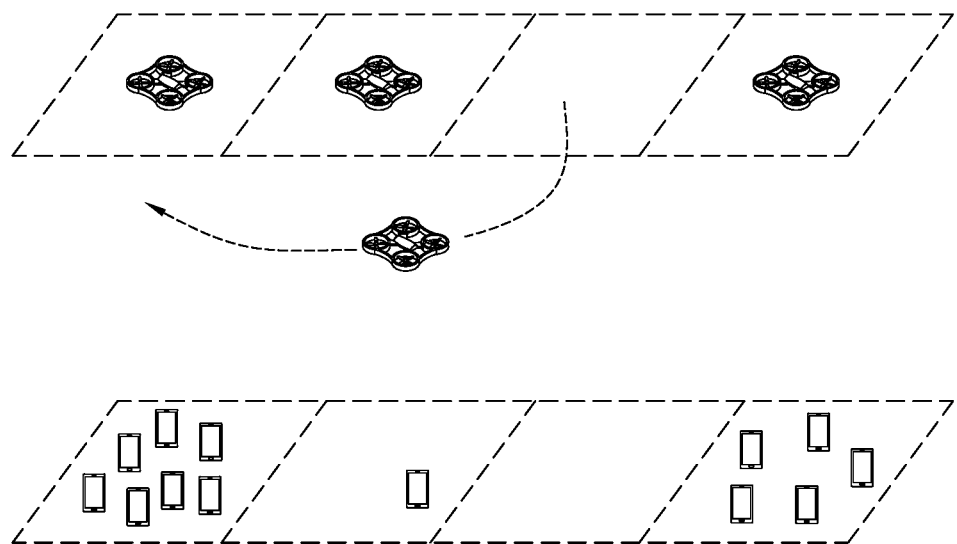
FIG. 9 is a schematic diagram of a method for reassigning a geographical region of a drone cell according to this specification.

FIG. 9 is a schematic diagram of a method for reassigning a geographical region of a drone cell according to this specification.

As shown in FIG. 9, a case where a plurality of nodes exist densely in a first geographical region and no node exists in a second geographical region will be assumed. In this case, a drone cell that is assigned to the second geographical region may relocate to the first geographical region, thereby being capable of supporting the plurality of nodes existing in the first geographical region.

The reassigning or change (i.e., relocation of a drone cell) of a geographical region that is assigned to a drone cell may be determined by the master base station or a drone cell based on the information that is shared among drone cells. In case the master base station determines the reassigning or change in the geographical region, the master base station may directly transmit a relocation instruction to a target drone cell, or the master base station may transmit a relocation instruction to a target drone cell by using a third drone cell as a waypoint. The master base station may also reassign the geographical regions for a plurality of drone cells at the same time. Additionally, in case a drone cell directly determines the reassigning or change in the geographical region, the corresponding drone cell may share the information on the reassigned geographical region with other cells.

Figure 10:
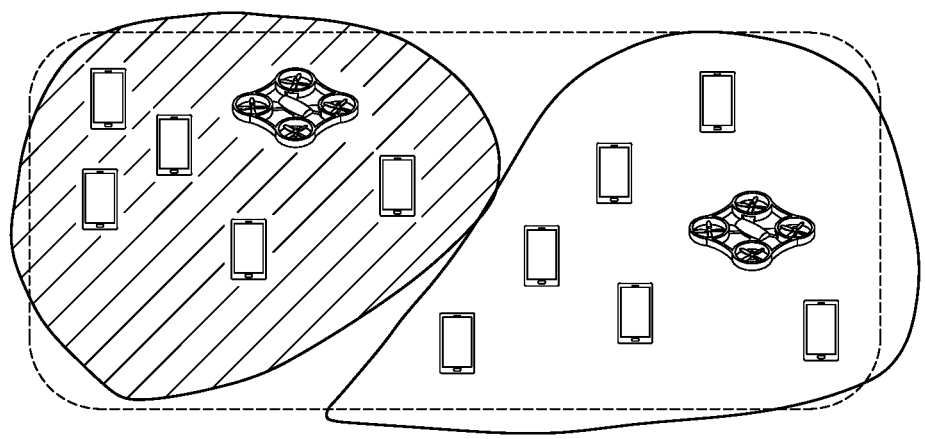
FIG. 10 is a schematic diagram of a method for performing a secondary assignment of a drone cell according to this specification.

FIG. 10 is a schematic diagram of a method for performing a secondary assignment of a drone cell according to this specification.

As shown in FIG. 10, as a result of another drone cell being assigned to a geographical region to which a drone cell is already assigned, a plurality of drone cells may exist in one geographical region. In this case, one geographical region may be divided into a plurality of sub-regions, and one or more drone cells may be secondarily assigned to the divided sub-regions.

According to an exemplary for secondarily assigning drone cells to the newly divided sub-regions, a first drone cell, which was primarily assigned to the geographical region that is divided to sub-regions, may instruct (or indicate) handover to a second drone cell to some or all of the nodes existing in the corresponding geographical region.

According to another example of secondarily assigning drone cells to divided sub-regions, the master base station may transmit information one the nodes that are to be respectively connected to the first drone cell and the second drone cell to each of the first drone cell and the second drone cell, and each of the first drone cell and the second drone cell may communication with the node by using the information received from the master base station.

According to yet another example of secondarily assigning drone cells to divided sub-regions, each of the plurality of drone cells being reassigned to the geographical region that is divided into sub-regions broadcasts signals for discovering nodes. And, a node that has received the signal from each of the plurality of drone cells may select a specific drone cell and may transmit a response signal corresponding only to the selected drone cell. For example, it will be assumed that a first drone cell and a second drone cell are assigned to the same geographical region, and that the first drone cell broadcasts a discovery signal A including information A for a response signal, and that the second drone cell broadcasts a discovery signal B including information B for a response signal. In this case, after the nodes existing in the corresponding geographical region receive the discovery signal A and the discovery signal B, the nodes perform a comparison of the intensity of the signals and the loads of the drone cells. Thereafter, the nodes may select the first drone cell and may transmit a response signal corresponding to the selected first drone cell.

5. Configuration of an Optimal Location for the Drone Cell

The provision of communication services using a drone cell may be provided by having a drone cell relay a communication between the master base station or a backbone network and a node, or by having a drone cell relay a communication among two or more nodes. Hereinafter, in the following description, a node transmitting information to a drone cell will be referred to as a source node, and a node receiving information from a drone cell will be referred to as a destination node. Herein, the source node or the destination node may correspond to any one of the master base station, a drone cell, a user device, and a sensor. However, this specification will not be limited only to this.

A communication between the source node and the destination node may be divided into a communication between the source node and a drone cell and a communication between a drone cell and the destination node. Accordingly, a reliability level of the communication between the source node and the destination node may vary in accordance with a communication (or channel) status between the source node and the drone cell and a communication (or channel) status between the drone cell and the destination node. Herein, it may be limited that the communication between the source node and the drone cell and the communication between the drone cell and the destination node use wireless-based RAT. In case a separate communication path does not exist between the source node and the destination node, a communication capacity between the source node and the destination node may correspond to a minimum value of a communication capacity between the source node and the drone cell and a minimum value of a communication capacity between the drone cell and the destination node. Therefore, the communication capacity between the source node and the destination node depends upon a location configuration and optimization of the drone cell.

Basically, the configuration of a location or travel path of a drone cell may be determined by considering all or some of the following elements.

A communication or channel status between a source node and a drone cell

A communication or channel status between a drone cell and a destination node

Locations of the source node and the destination node and a distance between the source node and the destination node Herein, the communication or channel status may be expressed in format, such as an equation corresponding to the communication capability, a Signal-to-Interference-plus-Noise Ratio (SINR), a RSRP or a RSRQ. Additionally, an optimal location of a drone cell may be estimated or configured in accordance with a pathloss that is calculated based on information on a location of each node or a distance between the nodes.

More specifically, the location information of a node may be surveyed by a GPS, and so on, or may be estimated by comparing the intensity of signals received from one or more cells. Most particularly, a location of the node according to this specification may be estimated by using only a signal that is received from only one drone cell.

Figure 11:
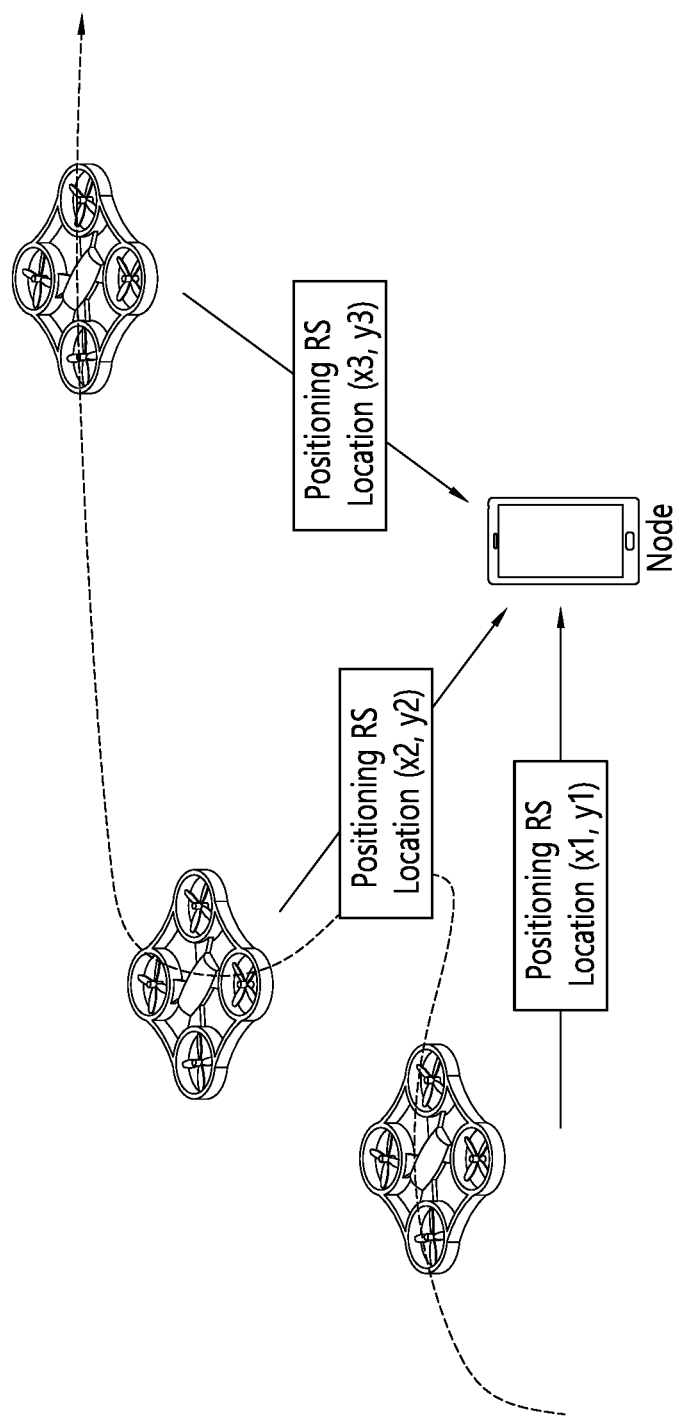
FIG. 11 is a schematic diagram of a method for estimating a location of a node by using a drone cell according to this specification.

FIG. 11 is a schematic diagram of a method for estimating a location of a node by using a drone cell according to this specification.

As shown in FIG. 11, a drone cell may transmit a Positioning Reference Signal from each of the plurality of geographical regions and location information of a drone cell to the node, and the node may estimate a location based on the plurality of positioning reference signals and location information. For example, a drone cell may transmit a first positioning reference signal from a first location and first location information to the node, and a drone cell may transmit a second positioning reference signal from a second location and second location information to the node, and a drone cell may transmit a third positioning reference signal from a third location and third location information to the node. Thereafter, the node may estimate a location based on first to third positioning reference signals and first to third location information.

As described above, location information of the surveyed or estimated node and/or distance information between the node and a drone cell may be transmitted along with a reference signal, a response signal, or a third signal that is transmitted to the drone cell by the node.

Figure 12:
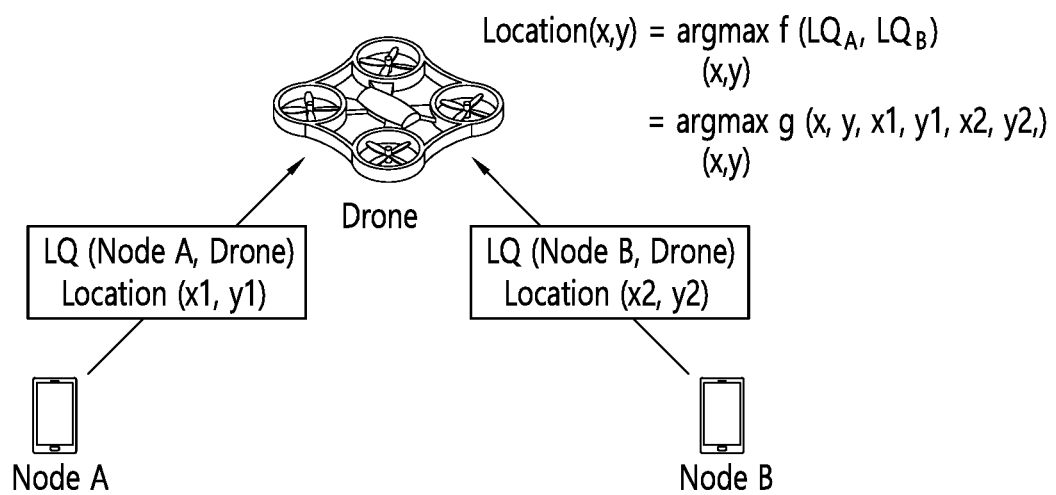
FIG. 12 is a schematic diagram of a method for configuring an optimal location of a drone cell according to this specification.

FIG. 12 is a schematic diagram of a method for configuring an optimal location of a drone cell according to this specification.

Based on the location information of the node and/or the distance information between the node and the drone cell, which are/is received from the node, the drone cell may configure an optimal location within the geographical region assigned to the drone cell. Before presenting a detailed description, it will be assumed that the drone cell has acquired information on a communication (or channel) status from a source node to a drone cell and information on a communication (or channel) status from a drone cell to a destination node. At this point, the information on a communication (or channel) status may be correspond too information measured from a plurality of geographical locations or information received from the master base station or another drone cell.

Referring to FIG. 12, the drone cell calculates a cost function based on location information of a node, distance information between a node and a drone cell, information on a communication (or channel) status from a source node to a drone cell, and information on a communication (or channel) status from a drone cell to a destination node. For example, the cost function may calculate a minimum value between a communication capability between the source node and the drone cell and a communication capability between the drone cell and the destination node as the overall communication capability. However, this specification will not be limited only to this. Additionally, by moving to or towards a point where the calculated cost function value becomes a maximum value, the drone cell may move (or relocate) to an optimal location.

Conversely, a pathloss model may be established based on the information on the communication (or channel) status between a drone cell and a node, and, then, based on the location information of each node, a point where a sum of a pathloss of a link between the source node and a drone cell and a pathloss of a link between a drone cell and the destination node becomes a minimum value may be estimated as the optimal location of the drone cell.

Figure 13:
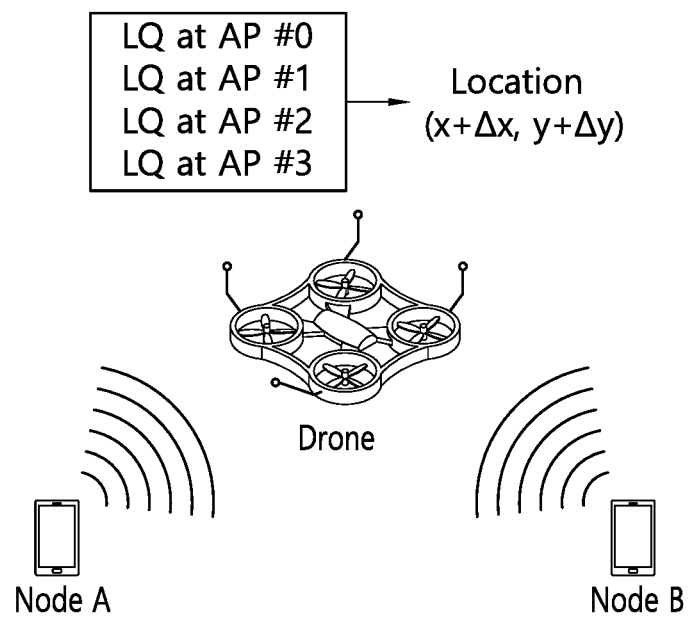
FIG. 13 is a schematic diagram of a method for estimating a travel direction (or moving direction) of a drone cell according to this specification.

FIG. 13 is a schematic diagram of a method for estimating a travel direction (or moving direction) of a drone cell according to this specification.

The drone cell assigns different antenna ports for antennas each facing a different direction. And, the drone cell may independently configure a reference resource, which is to be used for the communication or channel estimation per antenna port, in accordance with a Time Division Multiplexer (TDM), a Frequency Division Multiplexer (FDM), and a Code Division Multiplexer (CDM), and so on. Alternatively, the drone cell may configure a reference resource, which is designated in advance. However, in this case, the reference resources may be configured to be orthogonal to one another for each antenna port.

The source node and the destination node may transmit a reference signal, and the drone cell may estimate a moving direction (or travel direction) for relocating itself to an optimal location based on the communication (or channel) status, which is measured for each of the antenna ports or for each of the reference resources. For example, as shown in FIG. 13, a drone cell may assign different antenna ports along four different directions, and, in accordance with the communication (or channel) status information that is estimated through each of the antenna ports, the moving direction of the drone cell may be determined as a direction along which the size of the received signal becomes larger.

It may be difficult to apply the above-described methods for estimating an optimal location or moving direction of a drone cell in an actual environment due to quantization or simplification. Therefore, instead of always applying the above-described methods for estimating an optimal location or moving direction of a drone cell, the above-described methods may be applied only in cases where the communication (or channel) status of a link between the source node and the drone cell or a link between the drone cell and the destination node exceeds a predetermined threshold. In this case, the threshold may be configured to have values that are independent from one another per link, and the threshold may also be configured through higher layer signaling.

6. Miscellaneous—Configuration of an Optimal Path for the Drone Cell

The above-described procedure for configuring an optimal location of a drone cell is advantageous in an environment where the drone cell transmits a signal from one source node to one destination node. Hereinafter, a communication method, wherein a drone cell moves around and collects (or gathers) information from a plurality of source nodes and then transmit the collected (or gathered) information to one or more destination nodes. Such communication method may be advantageous when applied to a field having flexible latency requirements.

Figure 14:
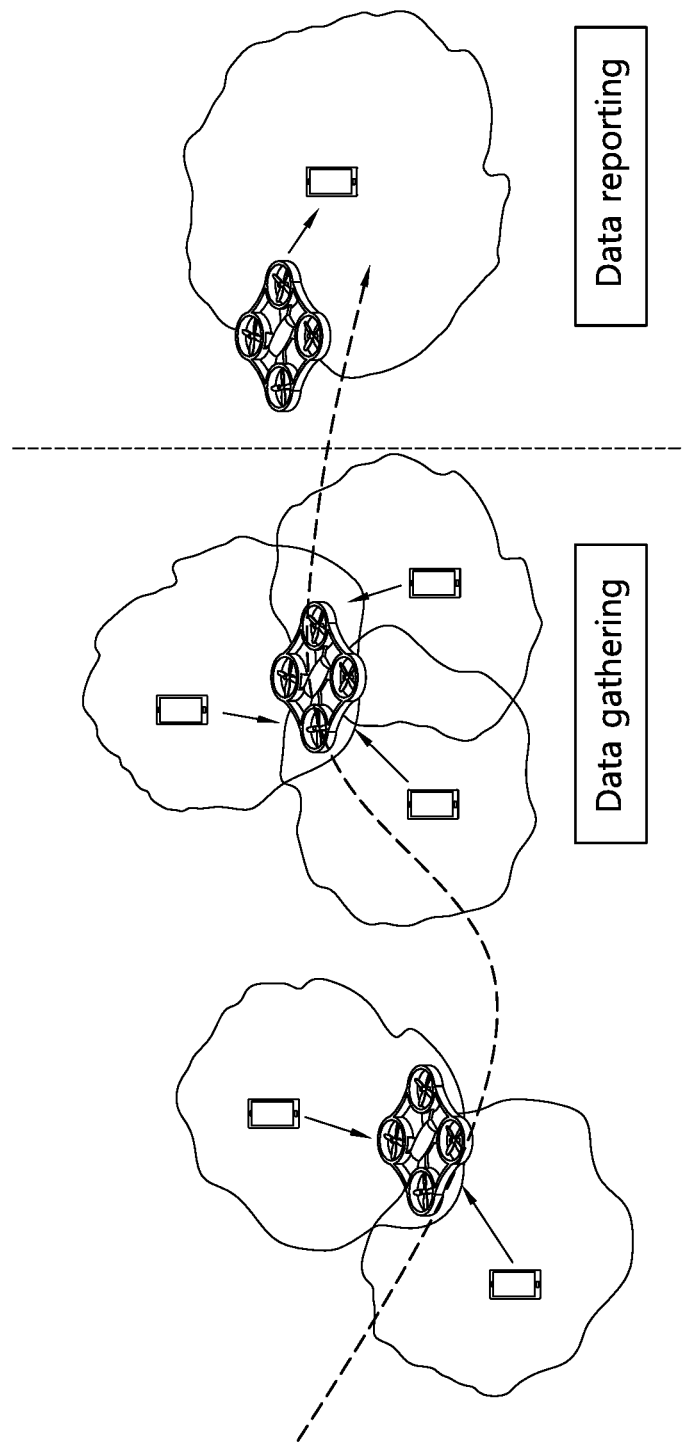
FIG. 14 is a schematic diagram of a method for configuring an optimal travel path of a drone cell according to this specification.

FIG. 14 is a schematic diagram of a method for configuring an optimal travel path of a drone cell according to this specification.

Referring to FIG. 14, a drone cell considers a communication (or channel) status between each source node and the drone cell and the threshold value. Thereafter, the drone cell configures one or more areas (or zones) where the drone cell can move around and collect data from each source node. At this point, the areas (or zones) in which the drone cell can collect data may correspond to areas with ensured reliability allowing the drone cell to safely collect data.

A drone cell considers a communication (or channel) status between each destination node and the drone cell and the threshold value. Thereafter, the drone cell configures one or more areas (or zones) where the drone cell can move around and transmit data to each destination node. At this point, the areas (or zones) in which the drone cell can transmit data may correspond to areas with ensured reliability allowing the drone cell to safely transmit data.

At this point, in case a plurality of areas in which the drone cell can collect data exist, the drone cell may configure a data collection (or gathering) travel path based on the location of each area in which the drone can collect data. In case a plurality of areas in which the drone cell can transmit data exist, the drone cell may configure a data transmission travel path based on the location of each area in which the drone can transmit data. In this case, the drone cell may configure the data collection travel path and the data transmission travel path by considering the travel distance and travel environment, and so on, of the drone cell. Additionally, the drone cell may configure an optimal travel path by combining the data collection travel path and the data transmission travel path.

Conversely, the drone cell may also configure its travel path while considering a location of a base station that is built on land. At this point, the base station that is built on land may correspond to a small cell. However, this specification will not be limited only to this. For example, in a situation where a node is already being provided with services from the small cell that is built on land, if an excessive number of nodes are concentrated to the corresponding small cell, or if a node requesting a special requirement from the corresponding small cell, in order to support the small cell, a drone cell may relocate to the geographical region in which the corresponding small cell is located. In this case, the drone cell and the small cell may operate as a single cell. For example, when a small cell supporting four transmitting antenna ports cooperates with a drone cell supporting another four transmitting antenna ports, the combination of the drone cell and the small cell may operate as a single cell supporting 8 transmitting antenna ports. For this, data may also be transmitted and received by using a backbone network existing between the drone cell and the small cell.

Figure 15:
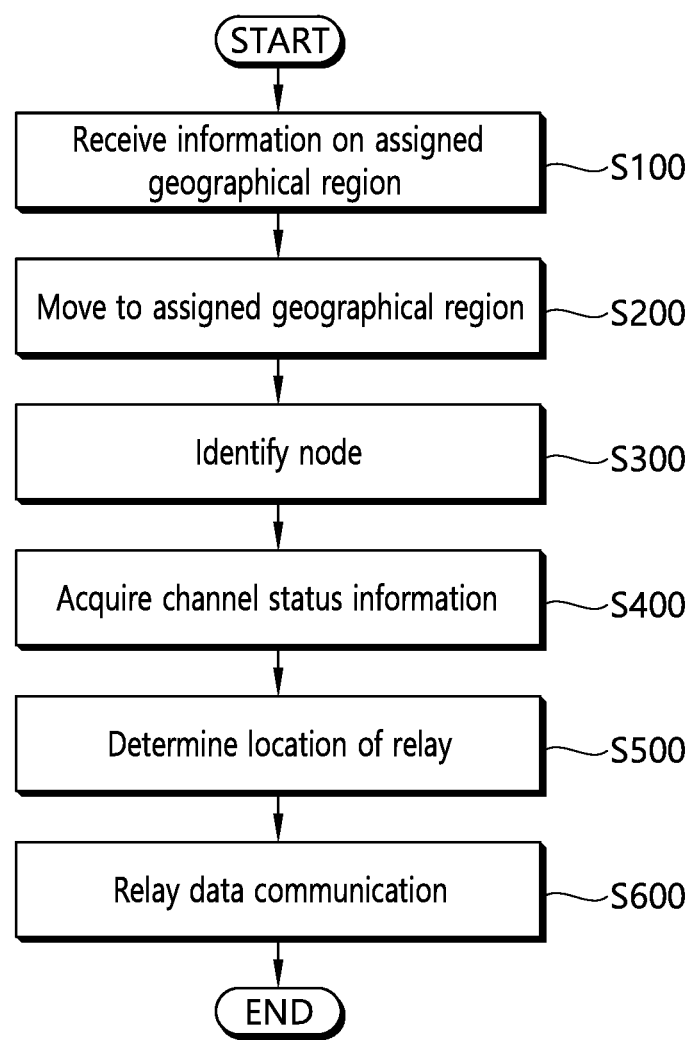
FIG. 15 is a flow chart showing a method for providing communication services according to a disclosure of this specification.

FIG. 15 is a flow chart showing a method for providing communication services according to a disclosure of this specification.

Referring to FIG. 15, a drone cell receives information on a geographical region that is assigned to the drone cell from a master base station (S100). Thereafter, the drone cell relocates to a specified initial location within the assigned geographical region based on the information on the assigned geographical region (S200). The drone cell that has arrived at the initial location may be on stand-by while floating in the air so that it does not deviate from the assigned geographical region.

The drone cell identifies any one of a source node to which data is to be transmitted and a destination node from which data is to be received within the assigned geographical region (S300). More specifically, the drone cell broadcasts a discovery signal corresponding to the assigned geographical region. Then, the drone cell receives a response signal corresponding to the discovery signal from any one of the source node and the destination node. Thereafter, the drone cell may identify any one of the source node and the destination node based on the received response signal.

The drone cell acquires first channel status information between the source cell and the drone cell (S400). And, the drone cell acquires second channel status information between the drone cell and the destination cell (S500). Herein, the first channel status information and the second channel status information may be acquired based on a response signal received from each of the source node and the destination node or may be received from another drone cell. Additionally, the channel status information may include RSRP and/or RSRQ.

Based on the first channel status information and the second channel status information, the drone cell determines its location where it is to positioned at a data communication relay point between the source node and the destination node (S600). In this case, the drone cell may determine a point where a cost function value, which is calculated based on the first channel status information and the second channel status information, becomes a maximum value as the location where the drone cell is to be positioned at the data communication relay point. Additionally, by using a pathloss model that is established based on the first channel status information and the second channel status information, the drone cell may determine a point where a sum of a pathloss of a link between the source cell and the drone cell and a pathloss of a link between the drone cell and the destination cell becomes a minimum value as the location where the drone cell is to be positioned at the data communication relay point.

Meanwhile, in case a plurality of source nodes exist, the drone cell may configure one or more areas where the drone cell may collect data from each source node. Additionally, in case a plurality of destination nodes exist, the drone cell may configure one or more areas where the drone cell may transmit data to each destination node. Additionally, based on the one or more areas where the drone cell may collect data from each source node and the one or more areas where the drone cell may transmit data to each destination node, the drone cell may also configure a travel path for transmitting data from the source node to the destination node.

Finally, based on the determined location, the drone cell relays data communication between the source node and the destination node (S700). More specifically, the drone cell may relay the data communication between the source node and the destination node by receiving data from the source node and by transmitting the received data to the destination node. In this case, in case a fixed base station providing communication services exists at a location where the drone cell is to be positioned at the determined relay point, communication services may be provided to the destination node by using the antenna ports equipped in the drone and the antenna ports equipped in the fixed based station at the same time.

The above-described exemplary embodiments of the present invention may be implemented by using diverse means. For example, the exemplary embodiments of the present invention may be implemented in the form of hardware, firmware, and software, or in a combined form of any of the above. This will be described in more detail with reference to the appended drawings.

Figure 16:
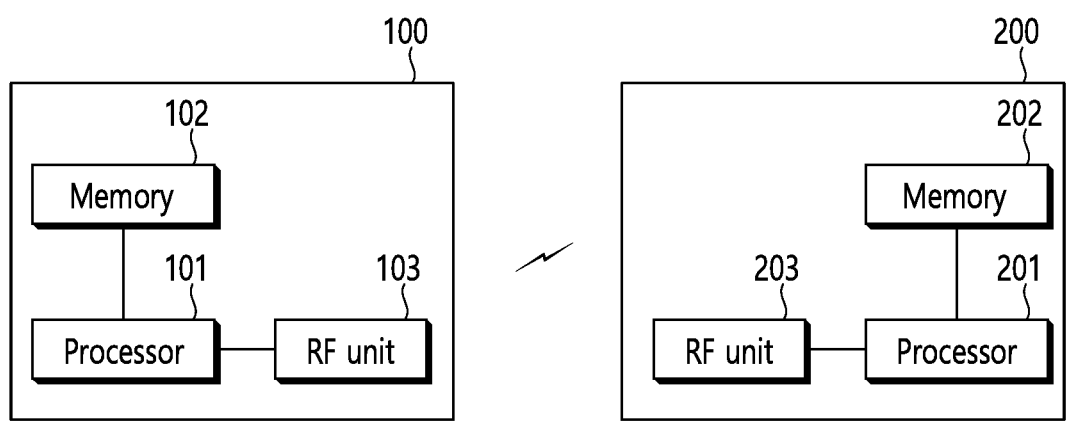
FIG. 16 is a block diagram illustrating a wireless communication system according to an embodiment of the present invention.

FIG. 16 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device (e.g., user equipment) 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 101.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for providing communication services by a cell having mobility, the method comprising:
   acquiring, by the cell having mobility, first channel status information between a source node to which data is to be transmitted and the cell having mobility;
   acquiring, by the cell having mobility, second channel status information between the cell having mobility and a destination node from which data is to be received; and
   determining, by the cell having mobility, a location where the cell having mobility is to be positioned at a data communication relay point between the source node and the destination node based on the first channel status information and the second channel status information,
   wherein the location of the cell having mobility is determined to be positioned at a point where a sum of a first pathloss of a first link with the source node and a second pathloss of a second link with the destination node is minimized based on a pathloss model established based on the first channel status information and the second channel status information.

2. The method of claim 1, wherein the cell having mobility is capable of moving along a horizontal direction and a perpendicular direction to an earth's surface.

3. The method of claim 1, wherein the step of determining the location comprises:
   configuring one or more areas where the cell having mobility is capable of collecting data from each source node based on an existence of a plurality of source nodes;
   configuring one or more areas where the cell having mobility is capable of transmitting data to each destination node based on an existence of a plurality of destination nodes; and
   configuring a travel path for transmitting data from the source node to the destination node, based on the one or more areas where the cell having mobility is capable of collecting data from each source node and the one or more areas where the cell having mobility is capable of transmitting data to each destination node.

4. The method of claim 1, wherein, in the step of determining the location, in a case where a fixed base station providing communication services exists at the location where the cell having mobility is to be positioned at the determined relay point, communication services are provided to the destination node based on antenna ports equipped in the cell having mobility and antenna ports equipped in the fixed base station simultaneously.

5. The method of claim 1, further comprising:
   receiving, by the cell having mobility, information on an assigned geographical region; and
   identifying, by the cell having mobility, any one of the source node and the destination node within the assigned geographical region.

6. The method of claim 5, wherein the step of identifying any one of the source node and the destination node comprises:
   broadcasting a discovery signal corresponding to the assigned geographical region;
   receiving a response signal corresponding to the discovery signal from any one of the source node and the destination node; and
   identifying any one of the source node and the destination node based on the received response signal.

7. A cell having mobility and providing communication services, comprising:
   a transmitter, and a receiver receiving first channel status information between a source node to which data is to be transmitted and the cell having mobility and receiving second channel status information between the cell having mobility and a destination node from which data is to be received; and
   a processor determining a location where the cell having mobility is to be positioned at a data communication relay point between the source node and the destination node based on the first channel status information and the second channel status information,
   wherein the location of the cell having mobility is determined to be positioned at a point where a sum of a first pathloss of a first link with the source node and a second pathloss of a second link with the destination node is minimized based on a pathloss model established based on the first channel status information and the second channel status information.

8. The cell of claim 7, wherein the processor:
   configures one or more areas where the cell having mobility is capable of collecting data from each source node, in a case where a plurality of source nodes exist;
   configures one or more areas where the cell having mobility is capable of transmitting data to each destination node, in a case where a plurality of destination nodes exist; and
   configures a travel path for transmitting data from the source node to the destination node, based on the one or more areas where the cell having mobility is capable of collecting data from each source node and the one or more areas where the cell having mobility is capable of transmitting data to each destination node.

9. The cell of claim 7, wherein, in a case where a fixed base station providing communication services exists at the location where the cell having mobility is to be positioned at the determined relay point, the processor provides communication services to the destination node based on antenna ports equipped in the cell having mobility and antenna ports equipped in the fixed base station simultaneously.

10. The cell of claim 7, wherein the processor further performs:
    receiving information on an assigned geographical region, and
    identifying any one of the source node and the destination node within the assigned geographical region.

11. The cell of claim 9, wherein the process of identifying any one of the source node and the destination node includes:
    broadcasting a discovery signal corresponding to the assigned geographical region, receiving a response signal corresponding to the discovery signal from any one of the source node and the destination node, and identifying any one of the source node and the destination node based on the received response signal.

12. The method of claim 1, wherein the location of the cell having mobility is determined to be positioned at a point where a cost is maximized based on a cost function established based on the first channel status information and the second channel status information.

13. The cell of claim 7, wherein the processor determines the location of the cell having mobility is determined to be positioned at a point where a cost is maximized based on a cost function established based on the first channel status information and the second channel status information.

* * * * *